United States Patent [19]

Iwase et al.

[11] 4,183,477
[45] Jan. 15, 1980

[54] CASSETTE ADAPTER

[75] Inventors: Hajime Iwase, Fujimi; Michio Kusuyama, Hachioji, both of Japan

[73] Assignee: Olympus Optical Co., Ltd., Tokyo, Japan

[21] Appl. No.: 900,923

[22] Filed: Apr. 28, 1978

[30] Foreign Application Priority Data

Apr. 28, 1977 [JP] Japan .............................. 52-54900[U]

[51] Int. Cl.² ...................... G11B 15/18; G11B 23/10
[52] U.S. Cl. ..................................... 242/198; 242/201; 242/209; 360/94
[58] Field of Search ............... 242/201, 202, 203, 204, 242/199, 200, 198, 197, 179; 360/94

[56] References Cited

U.S. PATENT DOCUMENTS 3,964,099  6/1976  Sato ........................................ 360/94

FOREIGN PATENT DOCUMENTS 900597  5/1972  Canada ...................................... 360/94

Primary Examiner—George F. Mautz

[57] ABSTRACT

A cassette adapter of this invention is incorporated into a reel drive type tape recorder to permit the use of a capstan drive type tape cassette. The cassette adapter houses a capstan drive type tape cassette and is incorporated into a tape cassette insertion position of the reel drive type tape recorder. The torques of reel shafts of the reel drive type tape recorder cause the reel shaft of the cassette adapter to be rotated and at the same time cause a switch for the capstan shaft drive motor to be switched ON.

7 Claims, 5 Drawing Figures

CASSETTE ADAPTER

BACKGROUND OF THE INVENTION

This invention relates to an adapter and in particular to a cassette adapter adapted to be incorporated into a reel drive type tape recorder to permit the use of a capstan drive type tape cassette.

A tape recorder can be generally classified into a reel drive type and capstan drive type. In the reel drive type tape recorder a tape drive force is obtained as the torque of a reel shaft and, when the reel shaft is rotated together with the reel hub, a magnetic tape is wound around the reel hub. In the capstan drive type tape recorder, a tape drive force is obtained as the torque of a capstan shaft which, together with a pinch roller, frictionally holds a magnetic tape, and a drive force of a reel shaft is obtained from another output source. Thus, a tape cassette is restricted in its application dependent upon its kind and a tape cassette for one type tape recorder can not be used for the other type tape recorder. An effective and economic way is for the user to be able to use either type of tape cassette in such case. U.S. Pat. No. 3,964,099 to Masaaki Sato issued June 15, 1976 discloses a cassette adapter which is incorporated into a tape recorder for a standard compact cassette to effect reproduction on a miniature cassette which is smaller than the standard compact cassette. This cassette adapter permits the use of a miniature tape cassette merely in the same type of tape recorder. The cassette adapter permits the use of the same type of the cassette, but can not be used for a different type of tape cassette. No cassette adapter has not yet proposed to date which permits an interchangeability between different type tape cassettes.

SUMMARY OF THE INVENTION

It is accordingly an object of this invention to provide a cassette adapter which permits the use of a capstan drive type tape cassette in a reel drive type tape recorder for reproduction.

According to this invention a tape cassette, a reel drive type or a capstan drive type, can be used for a reel drive type tape recorder.

According to one preferred embodiment there is provided a cassette adapter comprising a pair of rotating shafts rotatably mounted on one of a pair of plates disposed in a spaced-apart relation to each other and adapted to be fitted over corresponding reel shafts, respectively, so that they can be rotated together with the reel shafts, a pair of reel shafts rotatably mounted on the other plate and over which reel hubs of a capstan drive type cassette are fitted, and a gear mechanism for transmitting the torques of the rotating shafts to the reel shafts of the cassette adapter. The cassette adapter further includes a capstan shaft and pinch roller between which a magnetic tape held in a tape cassette is frictionally held, an electric motor including a start switch to permit the capstan shaft to be rotated, an operation mechanism adapted to, when the reel shaft of a reel drive type tape recorder is rotated in a reproduction mode, be operated by the torque of the reel shaft to cause the motor to be started, and a magnetic head adapted to engage the magnetic tape. When the reel shaft is rotated by operating the reel drive type tape recorder, the reel shaft of the cassette adapter is rotated by the rotating shaft of the cassette adapter. When the reel shaft is rotated the motor is immediately started by the operating mechanism, causing the capstan shaft to be driven. That is, when the reel drive type tape recorder is operated, reproduction is automatically performed on a capstan drive type tape cassette in the cassette adapter. If the pinch roller and magnetic head are moved away from the magnetic tape, an FF mode and REW mode can of course be effected.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF ONE PREFERRED EMBODIMENT

Figure 1:
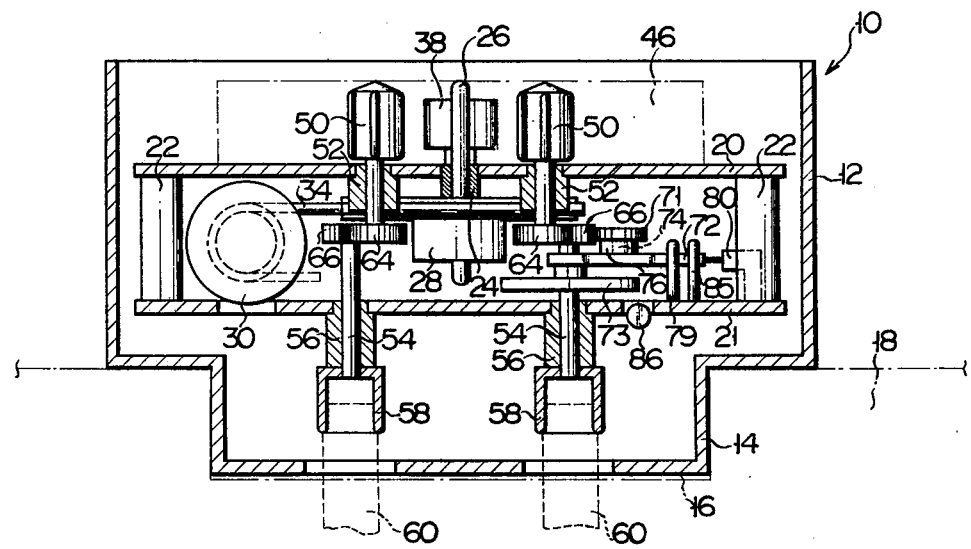
FIG. 1 is a longitudinal cross-sectional view showing a cassette adapter according to one preferred embodiment of this invention.

As shown in FIG. 1 a cassette adapter 10 according to one preferred embodiment of this invention has a casing 12 including a narrow base portion 14. The base portion 14 of the casing 12 is mounted in a cassette loading section 16 of a reel drive type tape recorder 18. Within the casing 12 a pair of upper and lower plates 20, 21 are arranged in parallel with each other such that they are spaced by a plurality of connecting rods 22. A capstan shaft 26 is rotatably supported by a bearing 24 from the upper plate 20. A flywheel 28 is mounted on the capstan shaft 26 and situated between the upper and lower plates 20, 21. As will be more evident upon viewing FIGS. 1 and 2 conjointly, a capstan drive motor 30 is horizontally disposed on the lower plate 21 and an endless belt 34 is adapted to be entrained between the flywheel 28 and a pulley 32 mounted on an output shaft 31 of the motor 30. Reference numeral 36 is an idler which is disposed between the flywheel 28 rotated in a horizontal plane and the pulley 32 rotated in a vertical plane, and adapted to give the endless belt a 90° turn.

Figure 3:
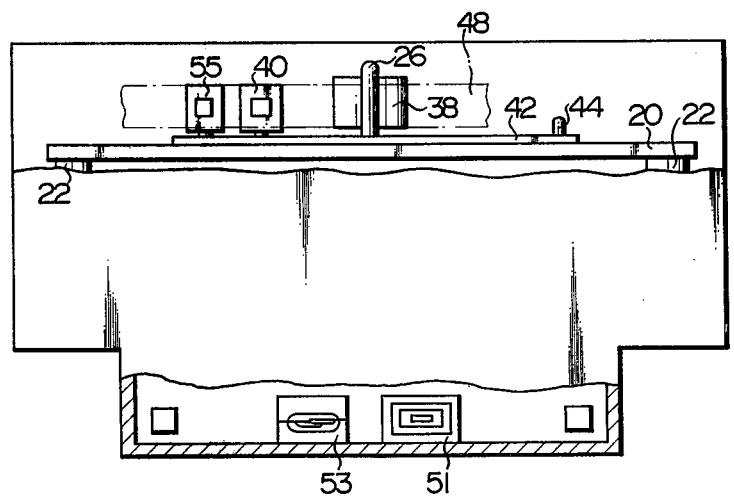
FIG. 3 is a front view, partly broken away, showing the cassette adapter of FIG. 1.

As will be most understood from FIG. 3 a pinch roller 38 made of a rubber and a magnetic head 40 are mounted on a head plate 42 which is so mounted that it can be rotated by a connection pin 44. By operating an operation lever (not shown), the head plate 42 is rotated around the connection pin 44 to cause the pinch roller 38 to be pressed against the capstan shaft 26. A magnetic tape 48 in the tape cassette 46 which is loaded into the cassette adapter 10 is frictionally sandwiched between the capstan shaft 26 and the pinch roller 38 and driven when the capstan shaft 26 is rotated by the motor 30. A pair of reel shafts 50 are so mounted on the upper plate 20 that they can be rotated through a bearing 52. A reel hub (not shown) of the capstan drive type tape cassette 46 is rotatably mounted on the upwardly extending end of the reel shaft. The magnetic head 40 is electrically connected through a lead wire (not shown) to the connecting head 51 which is contacted with a magnetic head (not shown) of the reel drive type tape recorder. A reed switch 53 is disposed adjacent to the connecting head 51 and adapted to operate an erase head 55 of the adapter 10 when the erase head (not shown) of the tape recorder 18 is operated.

Figure 2:
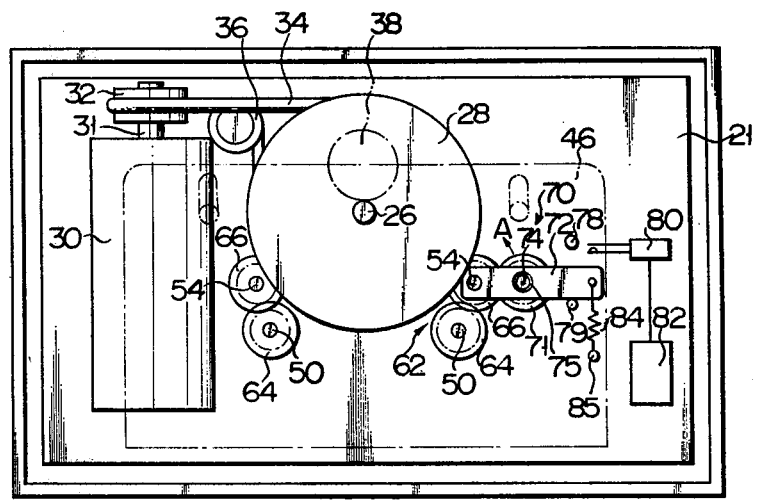
FIG. 2 is a plan view of the cassette adapter of FIG. 1 with an upper panel removed, some parts of the cassette adapter being omitted to avoid an unnecessary complication.

As shown in FIGS. 1 and 2, a pair of rotating shafts 54 are rotatably supported respectively through respective bearings 56 on the lower plate 21. Each of the respective rotating shafts 54 has a hollow cylindrical section 58 at the lower end. A reel shaft 60 of the reel drive type tape recorder 18 is fitted into each hollow cylindrical section 58. This permits each reel shaft 60 and thus each rotating shaft to be rotated as a unit.

The torques of the rotation shafts 54 are transmitted by a pair of gear means 62 to the respective reel shafts 50. Each of the respective gear means 62 comprises a gear 66 secured to the upper end of the rotating shaft 54 and a gear 64 fixed to the lower end of the reel shaft 50 and engaging with the gear 66.

An operating mechanism 70 is interlockingly associated with the gear means 62 and, when the reel shaft 60 is driven to reproduce the magnetic tape, automatically starts the motor 30, causing the capstan shaft 38 to be rotated. As shown in FIGS. 1 and 2, the operating mechanism 70 includes an external planetary gear 71 which engages with one of the gears 64 and 66 of the gear means 62. In the embodiment shown, the external planetary gear 71 engages with the gear 66. An operation lever 72 is rotatably supported on the rotating shaft 54 on which is mounted the gear 66. A rotation number detection plate 73 is concentrically mounted on the rotating shaft 54. The planetary gear 71 is mounted on a support shaft 74 which is detachably and loosely fitted in a support hole 75 of the lever 72. An annular friction plate 76 is disposed around the shaft 74. Since the friction plate 76 is compressed between the planetary gear 71 and the lever 72, a frictional force is produced between the frictional plate 76 and the planetary gear 71 and between the frictional plate 76 and the lever 72. The torque of the planetary gear 71 is transmitted through the frictional plate 76 to the lever 72, permitting the lever 72 to be rotated about the rotation shaft 54. A pair of stop pins 78, 79 are provided one at each side of the lever 72 to restrict the rotational range of the lever 72. A switch 80 for the motor 30 is disposed adjacent to the stop pin 78. When the switch 80 is switched ON, a power source 82 for a motor circuit is electrically connected to the motor 30 to cause the capstan shaft 26 to be rotated. The lever 72 is biased, by a bias means such as a tension spring 84 horizontally disposed between a pair of support pins fixed on the lower plate 21 and the forward end of the lever 72, respectively, into abutting engagement with the stop pin 79. When the rotation shaft 54 is in a reproduction mode, for example, rotated in a counter-clockwise direction, the gear 66 is clockwise rotated due to a meshing engagement of the gear 64 with the gear 66 and the external planetary gear 71 tends to be rolled around the gear 66 in a direction indicated by an arrow A in FIG. 2. The torque of the planetary gear 71 is transmitted by the frictional plate 76 to the lever 72 which in turn is rotated in the counter-clockwise direction (toward the stop pin 78) against a bias force of the spring 84 with the rotation shaft 54 as a center. The lever 72, before being abutted against the stop pin 78, is abutted against the switch 80, causing it to be switched ON to permit the motor 30 to be started.

When the lever 72 is abutted against the stop pin 78 after the switch 80 has been switched ON, the support shaft 74 of the planetary gear 71 idles within the support hole 75 of the lever 72.

Figure 4:
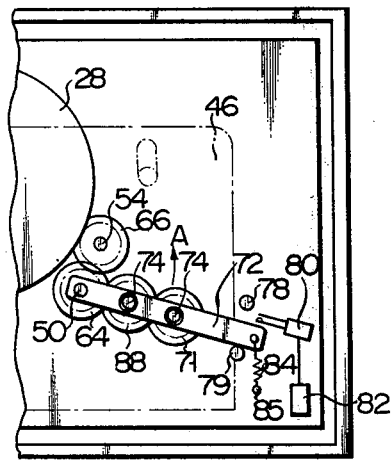
FIGS. 4 and 5, each, are a partial plan view of the cassette adapter, similar to that of FIG. 2, showing a modified form of operating mechanism.

The external planetary gear 71 of the operating mechanism 70 can be engaged with the gear 64. In this case, it is necessary that a planetary idler gear 88 be supported on the lever and that the planetary idler gear 88 be disposed between the planetary gear 71 and the gear 64 as shown in FIG. 4 so as to cause the planetary gear to be rolled in a direction indicated by an arrow A. The planetary gear 88 is mounted on the support shaft 74 which is loosely fitted in the lever 72, but no frictional plate is disposed since this gear is an idle one.

Figure 5:
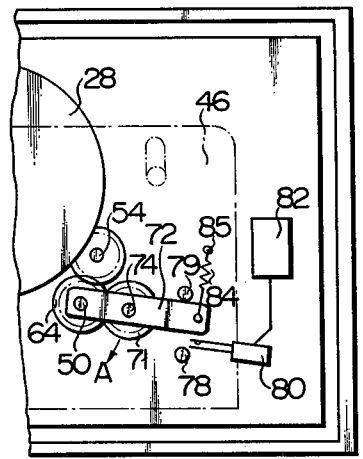

Instead of using such an idler planetary gear 88, a switch 80, stop pins 78, 79 and spring 84 may of course be arranged, as shown in FIG. 5, opposite to those in FIG. 2 with respect to the lever 72.

A permanent magnet is provided in the rotation number detection plate 73. The rotation of the detection plate 73 is detected by a reed switch 86 which is disposed near the detection plate 73. The output of the reed switch 86 is applied to a series-connected discriminating circuit in the motor circuit. When the number of pulses from the reed switch 86 does not exceed a reference value, the discriminating circuit is turned ON and, when the number of pulses exceeds the reference value, the discriminating circuit is turned OFF. When the discriminating circuit is turned ON, an audio circuit and motor circuit are closed to cause the cassette adapter to take a reproduction mode.

With the above-mentioned construction, the cassette adapter 10 is incorporated into the cassette loading section of a reel drive type tape recorder, permitting the use of a capstan drive type cassette. That is, when the cassette adapter 10 is incorporated into the cassette loading section 16 of the reel drive type tape recorder 18, the base portion 14 of the casing 12 is fitted into the cassette loading section 16 of the tape recorder 18. As a result, the hollow cylindrical section 58 of each rotating shaft 54 is fitted over the reel shaft 60 on the cassette loading section 16 of the tape recorder. A capstan drive type cassette 46 is loaded into the adapter 10 to cause the magnetic head 40 and pinch roller 38 to be contacted with the magnetic tape 48 in the cassette 46. When the reel drive type tape recorder 18 is brought, for example, into a reproduction mode, the reel shaft 60 of the tape recorder 18 is rotated. The torque of the reel shaft 60 is transmitted by the gears 64 and 66 to each of the reel shafts 50. The rotation of the planetary gear 71 or planetary gears 71, 88 causes the rotation of the operating lever 72, causing the switch 80 to be switched ON and thus rotating the motor 30 in a predetermined direction. As a result, the capstan shaft 26 is rotated and the magnetic tape 48 in the cassette 46 is frictionally sandwiched between the capstan shaft 26 and the pinch roller 38 and fed in a predetermined direction in a manner contacted by the magnetic head 40. Since at this time the number of pulses produced through the reed switch 86 is small, the discriminating circuit is turned ON, and the audio circuit and motor circuit are closed, thereby performing a predetermined reproduction operation.

When the pinch roller 38 and magnetic head 40 are moved away from the magnetic tape 48 for an FF operation, the number of pulses produced through the reed switch 86 is increased, causing the discriminating circuit to be opened. As a result, the audio circuit and motor circuit are not operated and the takeup reel shaft in the cassette adapter 10 is rotated, thus leading to an FF mode.

When a REW operation is to be effected with the pinch roller 38 and magnetic head 40 moved away from the magnetic tape 48, the supply reel shaft in the cassette adapter 10 is rotated in the opposite direction, resulting in a REW mode.

With the reel drive type tape recorder 18 in the halt state, the cassette adapter 10 is brought to a halt state. The cassette adapter 10 of this invention is incorporated into the reel drive type tape recorder, permitting the use of the capstan drive type cassette 46. Therefore, the use of the adapter of this invention permits the use of either type of cassette.

What we claim is:

1. A cassette adapter for incorporation into a reel drive type tape recorder to permit the use of a capstan drive type tape cassette comprising:

a plate;
   a pair of rotating shafts rotatably mounted on said plate and adapted to be engaged with corresponding reel shafts of the reel drive type tape recorder so that they can be rotated together with the reel shafts;
   a pair of reel shafts rotatably mounted in said adapter and over which the capstan drive type tape cassette can be fitted;
   gear means for transmitting the torques of the rotating shafts to the reel shafts of the cassette adapter;
   a pinch roller and capstan shaft between which a magnetic tape received in the capstan drive type tape cassette is frictionally sandwiched;
   a capstan drive motor having a start switch;
   connection means between said drive motor and capstan shaft;
   an operation mechanism operably connected to one of the reel shafts of the reel drive type tape recorder and adapted to, when the reel shaft of the reel drive type tape recorder is rotated in a reproduction mode, be operated by the torque of the reel shaft to actuate said switch and cause the motor to be started to rotate the capstan shaft; and
   a magnetic head adapted to be contacted with the magnetic tape.

2. A cassette adapter adapted for incorporation into a reel drive type tape recorder to permit the use of a capstan drive type tape cassette comprising:

a plate;
   a pair of rotating shafts rotatably mounted on said plate and adapted to be engaged with corresponding reel shafts of the reel driven type tape recorder so that they can be rotated together with the reel shafts;
   a pair of reel shafts rotatably mounted in said adapter and over which the capstan drive type tape cassette can be fitted;
   gear means for transmitting the torques of the rotating shafts to the reel shafts of the cassette adapter, said gear means comprising a pair of first gears mounted on said rotating shafts, respectively, and a pair of second gears mounted on said reel shafts, respectively, of the cassette adapter such that they engage with said first gears, respectively;
   a pinch roller and capstan shaft between which a magnetic tape received in the capstan drive type tape cassette is frictionally sandwiched;
   a capstan drive motor having a start switch;
   connection means between said drive motor and capstan shaft;
   an operation mechanism operably connected to one of the reel shafts of the reel drive type tape recorder and adapted to, when the reel shaft of the reel drive type tape recorder is rotated in a reproduction mode, be operated by the torque of the reel shaft to actuate said switch and cause the motor to be started to rotate the capstan shaft, said operation mechanism comprising an external planetary gear operatively engaging with one of the first and second gears and adapted to be rolled around said one gear, and a rotatable operating lever supporting said planetary gear and adapted to, when the planetary gear is rolled around said one gear, be rotated to cause said switch to be switched ON; and
   a magnetic head adapted to be contacted with the magnetic tape.

3. A cassette adapter according to claim 2, further including a frictional plate disposed between the planetary gear and the operating lever to transmit a torque produced on the planetary gear to the operating lever.

4. A cassette adapter according to claim 2 in which the operation mechanism includes bias means for biasing the lever into an inoperative position.

5. A cassette adapter according to claim 4, in which said bias means is a tension spring.

6. A cassette adapter according to claim 4 in which the operating mechanism includes a pair of stop pins disposed one at each side of the lever to restrict a rotation range of the lever.

7. A cassette adapter according to claim 2 in which there is provided a second planetary gear supported on the operating lever together with the first said planetary gear and adapted to be engaged with the first said planetary gear and said one gear.

* * * * *